Nov. 10, 1959     T. A. ROBERTSON     2,912,115
BABY FOOD WARMER
Filed Aug. 9, 1955
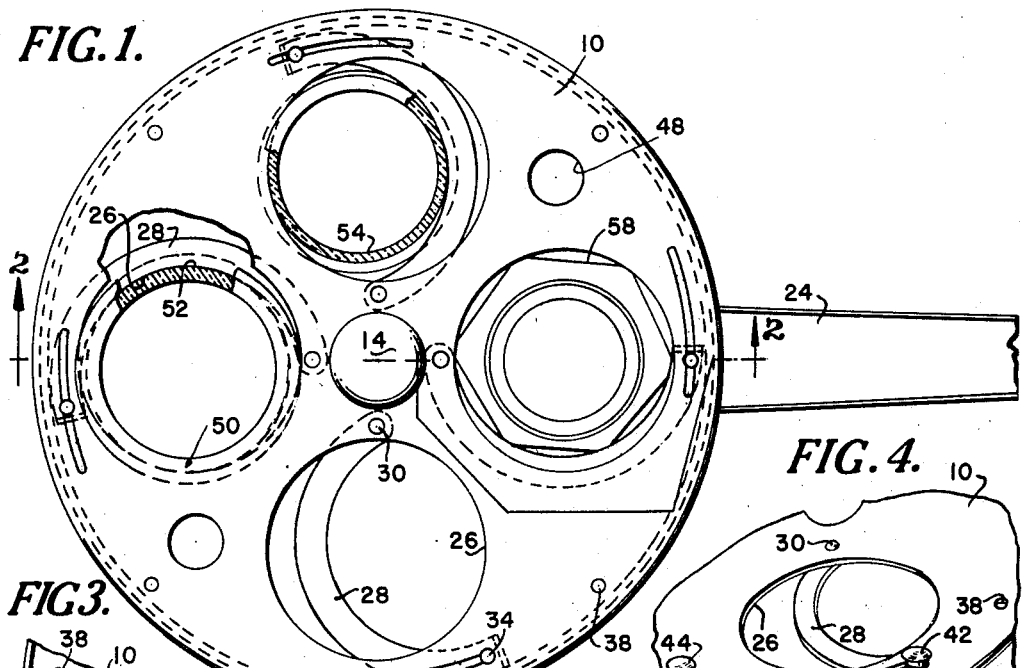
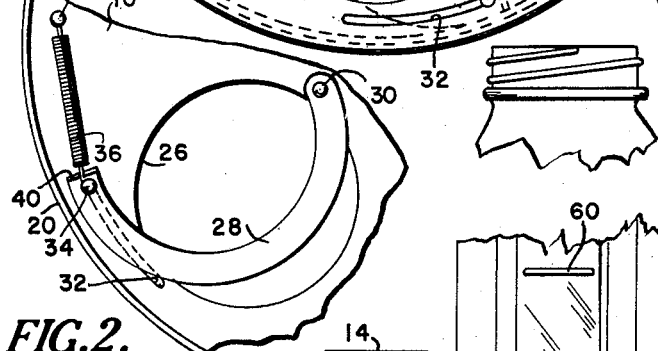
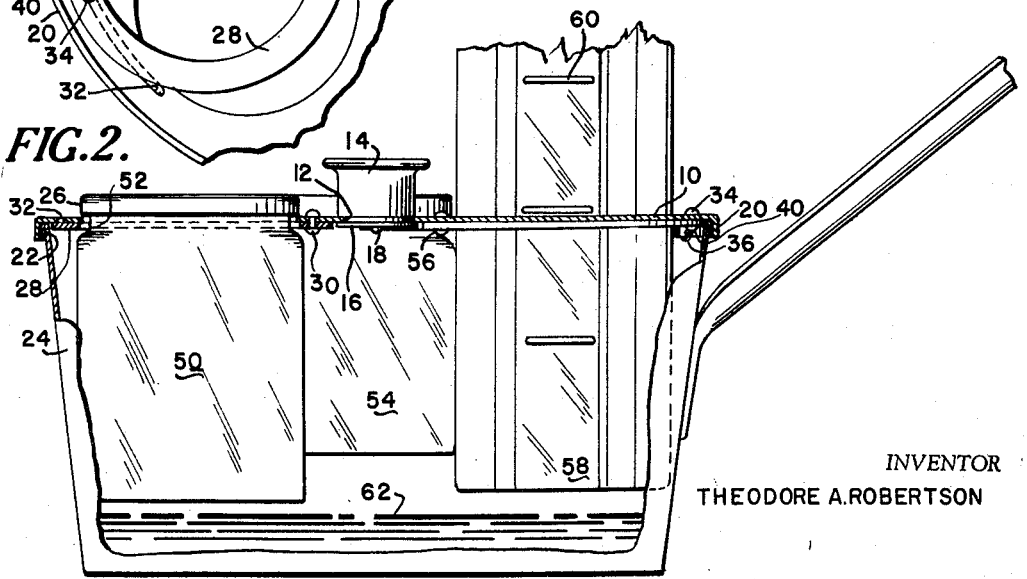
INVENTOR
THEODORE A. ROBERTSON
BY
*Cushman, Darby & Cushman*
ATTORNEYS

2,912,115

BABY FOOD WARMER

Theodore A. Robertson, Chicago, Ill.

Application August 9, 1955, Serial No. 527,360

3 Claims. (Cl. 211—74)

This invention relates to devices for warming food, and is directed particularly to a food warmer adapted to heat prepared foods, such as baby foods, in their original containers.

A principal object of the invention is to provide a food warmer of wide utility, designed for use with common sauce pans and other readily available water heating utensils. A related object is to provide a versatile food warmer, adapted for simultaneously heating one or more food containers, which may be of identical or different sizes and configurations.

Another object is to provide a food warmer adapted to receive a plurality of containers, and provided with a plurality of clamp members for convenient and individual engagement of each container.

A further object is to provide a food warmer capable of heating, in a simple operation, a complete and varied meal for an infant, which may include prepared foods in containers of different size, milk in nursing bottles, and the like. Another object is the provision of a device facilitating the serving of foods directly from containers.

Other objects are to provide a food warming device of simple and sturdy construction, readily manipulated and handled under all conditions, and easily cleaned. Further objects will be in part evident and in part pointed out hereinafter.

The invention and the novel features thereof may best be made clear from the following description and the accompanying drawings, in which:

Figure 1 is a top plan view of an illustrative embodiment of the invention, with baby food jars of different size and a nursing bottle positioned therein;

Figure 2 is a sectional view taken along the line 2—2 of Figure 1;

Figure 3 is a partial bottom plan view of the device of Figure 1, illustrating details of the clamp structure, and Figure 4 is a partial perspective view illustrating a variation, incorporating finger grips to facilitate clamp manipulation.

Referring to the drawings in detail, the exemplary embodiment illustrated in Figures 1, 2 and 3 includes a plate member 10, preferably flat and round. At its center, the plate member is provided with an opening 12 in which is mounted a lifting knob 14, the knob being engaged to the plate member in conventional manner, as by the washer 16 disposed below the plate member and the screw 18 extending through the washer into the knob. The plate member is provided with a downwardly extending lip 20 at or near its periphery, by means of which it is adapted to fit over and enclose the rim 22 of a conventional sauce pan 24, or similar water holding utensil. As will be apparent, the lip 20 may be continuous or discontinuous, and may engage either the inside or outside of the sauce pan. Similarly, the plate member and lip may be dimensioned to fit a sauce pan of common size, or may be shaped to fit a non-circular utensil, such as a rectangular pan.

The plate member 10 is provided with a plurality of container receiving apertures 26, four symmetrically arranged apertures being illustrated. Adjacent each aperture 26 a clamp member 28 is mounted for transverse movement with respect thereto. In the preferred form illustrated, the clamp members are curved to correspond generally to the radius of the apertures, and each is pivotally engaged to the underside of the plate member as by means of a rivet 30, desirably located between the center of the associated aperture and the center of the plate member. The pivotal mounting of each clamp member adapts it for movement transversely with respect to the adjacent aperture, in a plane parallel to and just below the plate member.

Outward of each aperture, that is between each aperture and the adjacent edge of the plate member, may be provided a guide slot 32, curved in the form of an arc about the cooperative pivot rivet 30. A rivet or pin 34 may extend upwardly from the free or swinging end of each clamp member 28 through its guide slot 32, whereby the guide slot serves to support the swinging end of the clamp member, and to limit its swinging movement in both directions.

The swinging end of each clamp member is resiliently engaged to the plate member as by means of a spring 36, which extends from a rivet 38 or other suitable attachment means to an ear 40 extending downwardly from the swinging end of the clamp member. As best illustrated in Figure 3, each spring 36 resiliently urges the engaged clamp member across the associated aperture to the extent permitted by its guide slot 32. The guide slot 32 is preferably of suitable length and disposition to permit the clamp member to approach the center of the aperture at one end of its travel, and to align its inner edge with the aperture at the other end of its travel.

As illustrated in Figure 4, the upper end of each pin 34 may be provided with a suitably shaped finger grip 42, for convenient manipulation of the clamp member, and cooperative finger grips 44 may be mounted on the upper surface of the plate member, each positioned oppositely from the adjacent clamp member spring 36, so that any grip pair 42 and 44 may be grasped by the thumb and a finger of each hand, and the grip 42 displaced toward grip 44 to extend spring 36 and retract the clamp member, as indicated by arrow 46 in Figure 4. The plate member may also be provided with steam holes 48, to permit free passage of steam or vapor at all times, and preclude any possibility of pressure building up therebelow.

The food warmer may be constructed of plastic, metal or other suitable material, of light gauge adequate to provide the necessary strength and rigidity. The container receiving apertures 26 are large enough, preferably, to receive the neck of a conventional 8 ounce baby food jar, being for example 2⅜ or 2½ inches in diameter. As will be obvious, the apertures are also adapted to receive containers of smaller size. In using the device, any number of containers up to the number of the apertures, which containers may represent a complete and varied infant's meal, may be selected and individually positioned in the food warmer. To mount a container in the device, a clamp member is retracted by finger pressure applied directly thereto or to a finger grip 42 if provided, and the container then positioned in the clear aperture 26. In the case of a jar, the neck of the jar may be placed in the aperture, most conveniently from below, and the clamp member then released to firmly engage it, by the action of spring 36. In Figures 1 and 2, 50 represents an 8 ounce baby food jar, firmly engaged at its neck 52 between one side of an aperture 26 and the inner edge of the cooperative clamp member 28.

Since the clamp members are independently mounted and operative, containers of different sizes and configuration may be mounted in the various apertures. For example, 54 represents a conventional baby food jar of 5 ounce size, engaged by its neck 56 in another aperture. The smaller jar is positioned in precisely the same manner as previously described, the clamp member in this case merely advancing further when released to engaging position. Similarly, a nursing bottle 58 may be positioned in any of the apertures, the frictional force exerted thereagainst by the engaging clamp member being adequate to hold it in desired vertically adjusted position. Additionally, many nursing bottles are provided with external volume indicating and other projections 60, which may rest on the aperture edge or clamp member and maintain the position of the bottle.

With all of the desired containers in place therein, the device may be handled as a unit by its edge or by means of its knob 14, and positioned on a sauce pan 24 or other suitable receptacle, and a suitable volume of water 62 therein heated to warm the contents of the containers. The plate member lip 20, as will be evident, serves to facilitate proper placement of the device on the sauce pan, and to retain it against inadvertent displacement. The water level in the sauce pan may be below the bottoms of the containers, to warm them by steam, or high enough to heat the containers by direct transfer, in accordance with personal preference and/or the food temperature desired. The several containers, of course, are warmed simultaneously and in a single convenient operation.

When the container contents are at proper temperature, they may be dispensed directly from the device, the clamp members serving to hold the containers firmly while their contents are spooned out or otherwise removed. The water 62 or vapor thereabove maintains all the foods at proper temperature while they are dispensed in any sequence. Alternatively, the containers may be removed and replaced individually, in any order desired. To remove any of the containers, the container may be grasped and moved to deflect the engaging clamp adequately to release the container, and the container then moved vertically from the surrounding aperture. Or if preferred, a container may be grasped in one hand, and its engaging clamp member retracted by the other to free the container.

When the feeding is completed, the device and all containers remaining therein may be carried to the sink as a unit, and the containers disengaged in the manner described. The food warmer, if desired, may then be washed with other dishes and utensils, in a pan, sink or automatic dishwasher.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. A container holding and warming device comprising a flat plate member, a peripheral lip extending downwardly from said plate member, said lip being adapted to fit and engage the top of a sauce pan, a plurality of container receiving apertures in said plate member, a curved clamp member pivotally engaged to the underside of said plate member adjacent each aperture, a curved slot in said plate member adjacent each aperture, means extending from the swinging end of each clamp through one of said slots whereby the slot limits the swinging movement of said clamp, and resilient means extending between the swinging end of each clamp member and the plate member urging the associated clamp member transversely across the adjacent aperture.

2. A container holding and warming device as defined in claim 1, wherein the means extending from the swinging end of each clamp member through the plate member slot constitutes a finger grip for said clamp member above said plate member.

3. A container holding and warming device as defined in claim 2, including a stationary finger grip fixed to the upper surface of said plate member adjacent each aperture, said stationary finger grips being disposed for cooperative utilization with said movable finger grips.

References Cited in the file of this patent

UNITED STATES PATENTS

| | | |
|---|---|---|
| 680,680 | Armstrong | Aug. 20, 1901 |
| 833,370 | Connies | Oct. 16, 1906 |
| 1,474,753 | Zrebiec | Nov. 20, 1923 |
| 2,093,593 | Warrick | Sept. 21, 1937 |
| 2,428,996 | Schworm | Oct. 14, 1947 |

FOREIGN PATENTS

| | | |
|---|---|---|
| 832,447 | France | July 4, 1938 |